(12) United States Patent
Scales et al.

(10) Patent No.: US 8,817,103 B2
(45) Date of Patent: *Aug. 26, 2014

(54) SYSTEM AND METHOD FOR VIDEO IMAGE REGISTRATION IN A HEADS UP DISPLAY

(75) Inventors: John Richard Scales, Huntsville, AL (US); Mark David Hose, Hunstville, AL (US)

(73) Assignee: Science Applications International Corporation, McLean, VA (US)

( * ) Notice: Subject to any disclaimer, the term of this patent is extended or adjusted under 35 U.S.C. 154(b) by 998 days.

This patent is subject to a terminal disclaimer.

(21) Appl. No.: 12/843,842

(22) Filed: Jul. 26, 2010

(65) Prior Publication Data

US 2010/0289724 A1    Nov. 18, 2010

Related U.S. Application Data

(62) Division of application No. 11/000,934, filed on Dec. 2, 2004, now Pat. No. 7,787,012.

(51) Int. Cl.
*H04N 7/18*    (2006.01)

(52) U.S. Cl.
USPC .......................................................... 348/158

(58) Field of Classification Search
CPC .................................................. G02B 27/0172
USPC ............................................... 348/158, 218.1
IPC ....................................................... H04N 7/18
See application file for complete search history.

(56) References Cited

U.S. PATENT DOCUMENTS

| 6,963,800 | B1 | 11/2005 | Milbert |
| 7,002,551 | B2 | 2/2006 | Azuma et al. |
| 7,277,118 | B2 | 10/2007 | Foote |
| 2006/0116814 | A1 | 6/2006 | Milbert |

OTHER PUBLICATIONS

QUANTUM3D, Inc., Daggers: Embedded Training for Dismounted Soldiers Scients and Technology Objective (STO), http://www.quantum3d.com/PDF/sstories/SStories_Daggers.pdf, 2004.
Sensor Technology Systems, Inc., Model 2733 Low Profile / Night Vision Goggle: AN/PVS-21: Operational Summary, 2004.
National Defense Magazine, Can the Army Make Objective Force Warrior Work?, http://www.nationaldefensemagazine.org/articl.cfm?Id=1173, Aug. 2003.
Intersense, Inc., Intersense InertiaCube2, http://www.isense.com/products/prec/ic2/InertiaCube2.pdf, 2004.
Yeh, Michelle, et al., "Effects of Frame of Reference and Viewing Condition on Attentional Issues with Helmet Mounted Displays", Technical Report, Jan. 1998, pp. 1-75.

(Continued)

*Primary Examiner* — Young Lee
(74) *Attorney, Agent, or Firm* — Banner & Witcoff, Ltd.

(57) ABSTRACT

A system and method for aligning video images with an underlying visual field are provided. A video camera is coupled with a heads up display, and a computer positions images from the video camera on the heads up display based on the relative orientations of the camera and the display. As the video camera moves with respect to the display, the images are repositioned within the heads up display. The video image, which may, for example, come from a weapon sight, is aligned within the heads up display so that an observer can easily view the camera image without having to shift focus from the larger scene.

12 Claims, 10 Drawing Sheets

(56) References Cited

OTHER PUBLICATIONS

Livingston, Mark A., et al., "Evaluating System Capabilities and User Performance in the Battlefield Augmented Reality System", published in Proc. NIST/DARPA Workshop on Performance Metrics for Intelligent Systems, Gaithersburg, MD, Aug. 24-26, 2004.

Hicks, Jeffrey, et al., "Eyekon: distributed Augmented Reality for Solider Teams", published in 21st Century Systems, Inc., 2001-2003, pp. 1-14.

"Competitive Analysis: Ground Guidance", downloaded from <http://www.primordial.com> on Dec. 11, 2006, date of first publication not known, 9 pages.

"Whitepaper: Ground Guidance", downloaded from <http://www.primordial.com> on Dec. 11, 2006, date of first publication not known, 15 pages.

"Primordial Soldier: Vision System for Soldiers", Product Sheet, downloaded from <http://www.primordial.com> on Dec. 11, 2006, date of first publication not known, 2 pages.

Primordial Soldier: Geographically-Enabled Augmented Reality System for Dismounted Soldiers (A05-119), Presentation, downloaded from <http://www.primordial.com> on Dec. 11, 2006, date of first publication not known, 35 pages.

"Primordial Soldier User manual", downloaded from <http://www.primordial.com> on Dec. 11, 2006, date of first publication not known, 26 pages.

"Primordial Soldier, Vision system software for soldiers", downloaded from <http://www.primordial.com> on Dec. 11, 2006, date of first publication not known, 6 pages.

"Competitive Analysis: Unit Detection, Differentiating friend from foe and assessing threats in a soldier's head-mounted display", downloaded from <http://www.primordial.com> on Dec. 11, 2006, date of first publication not known, 8 pages.

"Whitepaper: Unit Detection, Differentiating friend from foe and assessing threats in a soldier's head-mounted display", downloaded from <http://www.primordial.com> on Dec. 11, 2006, date of first publication not known, 16 pages.

FIG. 1
(PRIOR ART)

200 (night vision goggles visual field)

FIG. 2

300 (video camera image)
301 (cross hairs)

FIG. 3

400 (visual field)
401 (weapon sight video feed)

SYSTEM AND METHOD FOR VIDEO IMAGE REGISTRATION IN A HEADS UP DISPLAY

CROSS-REFERENCE TO RELATED APPLICATIONS

This application is a divisional of U.S. patent application Ser. No. 11/000,934, titled "System and Method for Video Image Registration in a Heads Up Display" and filed Dec. 2, 2004, now U.S. Pat. No. 7,787,012, which application is incorporated by reference herein in its entirety.

FIELD OF THE INVENTION

The invention relates generally to the display of video images. More particularly, the invention provides a method and system for registering a video image with an underlying visual field, such as in a heads up display.

BACKGROUND OF THE INVENTION

Modern warfare has seen its share of technological improvements which have led to weapons that can be targeted with ever increasing levels of speed and accuracy, enabling weapon operators to react more quickly when a situation suddenly changes. While tanks, jets, missiles, combat planning systems, and other technological implements have kept pace with modern electronics, some familiar tools of modern warfare have remained virtually unchanged for centuries. Perhaps foremost among these essential components is the infantryman: the soldier carrying light arms deployed on foot.

Infantrymen have benefited to some extent from modern technology with the advent of laser sights, night vision goggles, and so forth. These have allowed the foot soldier to navigate at night, and accurately dispatch their targets. These technologies ultimately help to keep the soldier safe under the cover of darkness, help give the element of surprise when needed, and also help ensure that the first shot fired is the one that hits the mark.

In spite of these advances, one problem which persists is the cumbersome process of acquiring and striking a target. At night, modern night vision goggles passively amplify miniscule amounts of ambient light, such as starlight, and enable a soldier to see obscured targets in the dark. Once a target is found in this fashion, however, a soldier must flip the goggles out of the way and reacquire the target with the sight on his weapon. This takes time away from the soldier, during which he might be seen by the target itself, or the target might move. In addition, reacquisition with the weapon's narrower field of vision may be virtually impossible with a distant or moving target.

Alternatively, a soldier, upon viewing a target with night vision goggles, may engage a laser illuminator on his weapon. The illuminator projects a beam of laser light following the line of sight of the weapon and striking where the bullet will strike. The soldier can keep his goggles on and see the illuminated point. He can move the point of the illuminator until it points to his target, and then fire as needed. While somewhat faster than lifting the goggles and reacquiring the target through the weapon sight, the illuminator may have the unintended effect of giving away the soldier's position. The laser illuminator may be just as obvious to an enemy as it is to the soldier. In the time it takes to maneuver his weapon into position, he may already be spotted and in the weapon sight of his enemy.

In the hopes of solving this and other problems inherent with current infantry technology, U.S. military planners have envisioned a technological revolution for the foot soldiers of tomorrow, dubbed Future Force Warrior. The project envisions, among other improvements, the porting of an infantryman's weapon sight into a heads up display (HUD) built into his night vision goggles. Such goggles exist now, as in Sensor Technology Systems' Model 2733 Low Profile Night Vision Goggle. They have the ability to port a video feed into a beam combiner, overlaying a video image from a video source mounted in the weapon sight onto the center of the visual field of the goggles.

Figure 1:
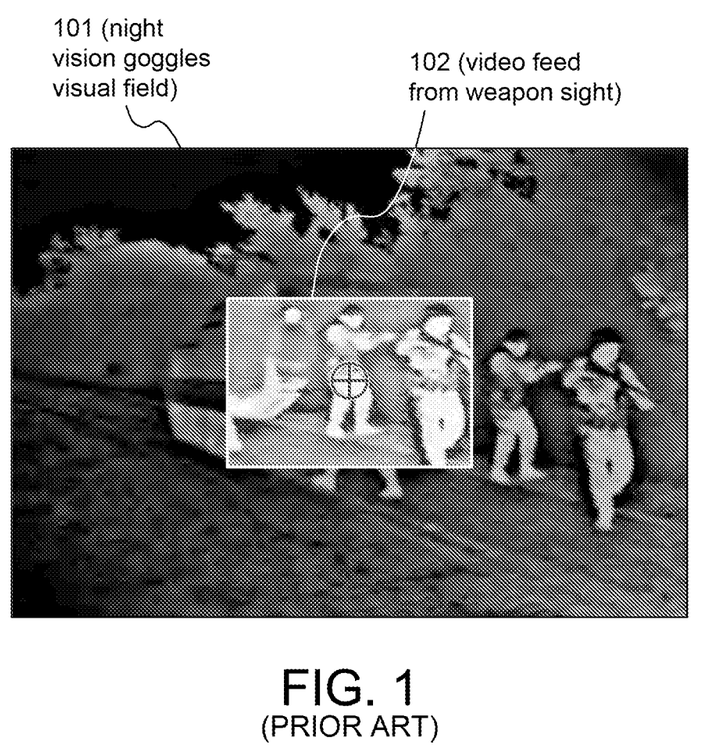
FIG. 1 illustrates a prior art example of a stationary video feed overlaying a visual field.

An example of such a combined image appears as prior art FIG. 1. Here, the video feed 102 from a weapon's sight is superimposed directly into the center of the night vision goggle's visual field 101. This is accomplished using a beam combiner, which optically overlays one image over another. Both images depict the same subjects, a group of soldiers accompanying an armored personnel carrier (APC). However, the video feed 102 remains stationary in the center of the visual field 101, obscuring content in the center of the visual field, in this case the APC and a soldier. The two images are distinctly offset, with the two soldiers to the right of the APC being repeated in both images. This offset, with two distinct images of the same target appearing in different places in the field of view, could confuse the soldier, causing a delay in engagement or a miss. If the soldier moves his weapon and turns his head simultaneously, the set of images moving in different directions may be even more confusing and disorienting to the soldier, potentially decreasing the soldier's ability to react and the accuracy of any shot fired.

Thus, it would be an advancement in the art if a video image from a video source could be integrated into the visual field of a heads up display without confusing or disorienting the observer, and without needlessly obscuring relevant visual content.

SUMMARY OF THE INVENTION

A first embodiment of the invention provides a method for aligning video images with an underlying visual field by determining a source orientation of a video source, determining a display orientation of a transparent display overlaying the visual field, and displaying video images in the transparent display, wherein a position for the images is based on the source orientation and the display orientation.

A second embodiment of the invention provides a system for displaying a portion of a video feed overlaying a visual field comprising a video camera, a heads up display (HUD), and a computer. Orientation sensors are affixed to the video camera and the HUD. The computer is adapted to receive sensor data from both orientation sensors, to receive the video feed from the video camera, and to display video images in the HUD.

DETAILED DESCRIPTION OF THE INVENTION

Figure 2:
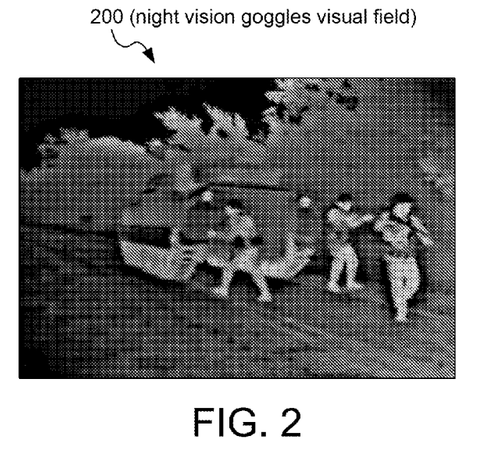
FIG. 2 illustrates an example of a visual field produced by night vision goggles.
Figure 3:
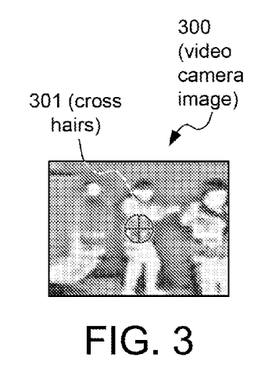
FIG. 3 illustrates an example image from a video camera capturing the same scene as the visual field of FIG. 2.

FIG. 2 illustrates an example of a visual field 200 as seen through the night vision goggles a foot soldier might wear. The image enhances ambient light, typically starlight, to enable the soldier to see into the night. The visual field depicts a handful of potential targets for the foot soldier. FIG. 3 illustrates an example image 300 from a video camera capturing the same scene as the visual feed of FIG. 2. The video camera producing the image 300 may be attached to a weapon carried by the foot soldier. The image 300 may be the product of a specialized camera or weapon sight, such as a thermal imager which makes infrared wavelengths visible, a starlight scope which amplifies ambient light using the same technology which enables night vision goggles, or any other video source such as a standard television camera. The video feed includes cross hairs 301 so that a soldier viewing the video feed will know exactly where a shot fired will hit. In addition, the video camera may magnify the image to aid target recognition and to increase accuracy.

The visual field 200 and the video image 300 differ in their field of view (FOV). The visual field of the night vision goggles allows for a greater amount of visual information to be viewed by the observer simultaneously without the observer having to move his head. The FOV of the video image 300, as from a weapon sight, is normally much narrower, presenting less of the visual field to the observer. As a result, a soldier looking directly through a weapon sight, or looking at the video feed produced by such a sight, will have to move the weapon in order to view the entire scene. For this reason, soldiers may search for and acquire targets at night using the wider FOV of night vision goggles, and switch to the weapon sight view only once they have decided upon a target. This takes time, thus slowing down the soldier.

Figure 4:
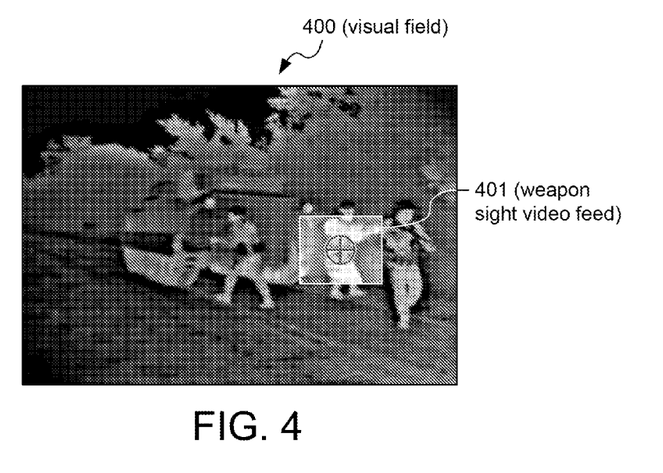
FIG. 4 illustrates the image produced by an illustrative embodiment of the invention.

The visual field 400 of FIG. 4 illustrates the image produced by an illustrative embodiment of the invention. The visual field 400, here the view through a soldier's night vision goggles or other (clear) goggles, is enhanced with the addition of a portion of the weapon sight video feed 401 through the use of a heads up display (HUD). With this embodiment of the invention, the video feed 401 may be modified so as to discard unneeded visual information, cropping the image to perhaps one quarter of its original size. In addition, the video feed 401 has been positioned over the portion of the visual field 400 based on the direction the video source is pointed. As the weapon moves, the video feed 401 is dynamically positioned within the visual field 400. Ultimately, by superimposing the two images, a soldier with a heads up display and a weapon mounted video camera is able to simultaneously survey a setting, acquire a target, and point his weapon at the target without taking time to shift from goggles to weapon sight.

It should be noted upfront that this superimposition of video images is not limited to weapon usage on a battlefield, although that is the dominant example used here. Other embodiments of the current invention could be used in a myriad of settings, including law enforcement, medicine, etc. For example, a surgeon could use such a device on his hand to provide a magnified view of an operating field embedded within a view of the entire patient's chest cavity. An astronomer could survey a star field visually while wearing some form of heads up display. Her telescope could be fitted with a video camera, the feed from which is dynamically fed into and positioned within the HUD. As such, she can view a magnified video image from the telescope without having to reposition herself before the telescope's eyepiece. Alternatively, her video source could produce a modified output, perhaps displaying a color-shifted spectrographic view of the light from a particular star. Similarly, a nephologist can survey a sky full of clouds and simultaneously focus in on clouds of particular interest without shifting. An ichthyologist, fitted with an underwater embodiment of the invention, could survey a school of fish and simultaneously focus in on a particular fish. In each of these alternative embodiments, a secondary video source is used to dynamically supplement an observer's field of view.

Figure 5:
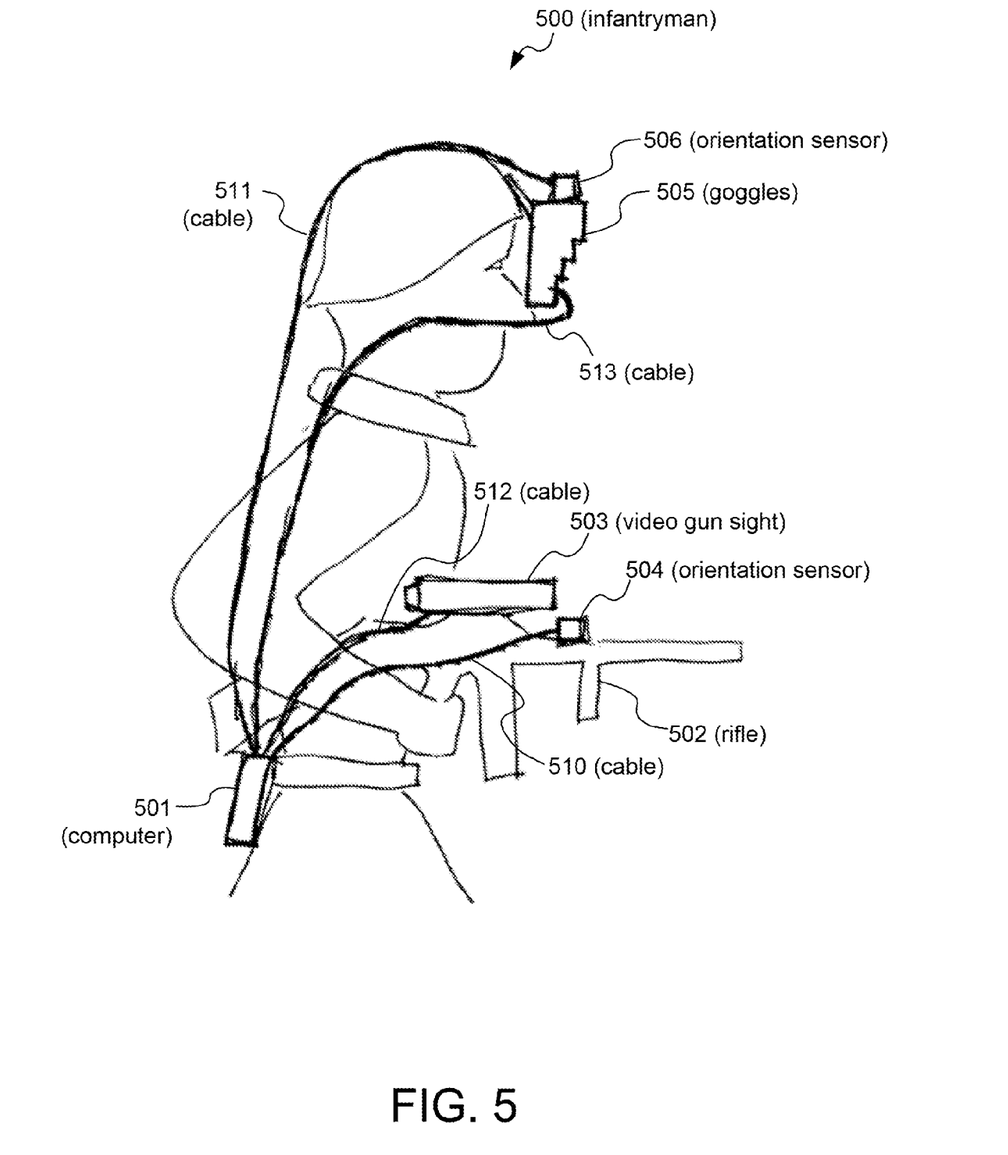
FIG. 5 illustrates the system employed by an illustrative embodiment of the invention.

FIG. 5 illustrates a system employed by an illustrative embodiment of the invention. Here, an infantryman 500 is fitted with goggles 505, a rifle 502 with video gun sight 503, and field computer 501. The goggles 505 may produce a visual field similar to the one illustrated in FIG. 2. The video gun sight 503 produces a video feed, possibly including cross hairs as in FIG. 3, depicting the line of sight of the rifle 502. The video weapon sight 503 may produce more than a standard unmagnified view, for example a magnified view, a thermal view, a night vision view, an image intensifier view, or some combination thereof.

In this embodiment, field computer 501 receives a video feed from video weapon sight 503 via cable 512. The video feed may be delivered using any standard video format, for example analog formats like NTSC or PAL, or digital formats like MPEG, or any non-standard format. The field computer 501 receives sensor data from orientation sensors 504 and 506, via cables 510 and 511. Once the video feed is processed, field computer 501 delivers video for the heads up display within the goggles 505, via cable 513.

The sensor 504 affixed to rifle 502 sends data relaying the orientation of the weapon and attached video gun sight 503. This data may include angular pitch, yaw, and roll information, sent in frequent intervals. An example of such a sensor is InterSense's InertiaCube3®, which uses the earth's gravitational and magnetic fields (among other means) to sense and report angular orientation around three axes of rotation up to 180 times per second. The sensor 506 affixed to goggles 505 relays similar orientation data, except that it reports on the line of sight of the goggles instead of the rifle 502. It should be noted that sensors 504 need not be directly affixed to the rifle 502, so long as it moves with the rifle. For example, it could be attached to the gun sight 503. Likewise, sensor 506 need not be directly affixed to the goggles 505. The sensor 506 could also be attached to the helmet of the infantryman 500.

In this embodiment, sensors 504, 506 use Universal Serial Bus (USB) cables 510, 511 to relay angular data, although any communication method is feasible. These cables, along with video cables 512, 513 may either be exposed or sewn into a soldier's clothing or his rifle sling to prevent entanglement of the wearer. Although wired sensors and video cables are used here, any form of wireless radio is feasible. For example, Ultra-wideband (UWB) transceivers may transmit video and sensor data from the weapon, and sensor data from the goggles. Likewise, UWB may be used to transmit video from the field computer 501 to the goggles 505. Although UWB radios, such as Time Domain's PulsON® radio, are particularly desirable for their high bandwidth, low power consumption and for being virtually undetectable, any wireless standard may be used, including both Bluetooth and IEEE 802.11.

In alternative embodiments, UWB radios may be used for more than transmission of video and sensor data. Multiple radios may be placed on the rifle 502 and on the goggles 505 (or on the helmet, to which the goggles may be affixed), each of which can relay their precise position. In this fashion, the field computer 501 may be able to calculate the alignment of the rifle and goggles based on the relative location of radios rather than use separate orientation sensors.

In other alternative embodiments, the heads up display need not be connected to the viewer, as through a pair of night vision goggles. For example, the heads up display could appear before a windshield in a vehicle. A weapon mounted on the vehicle includes a video gun sight producing images processed and projected onto the heads up display. In this embodiment, an orientation sensor may be placed to sense the orientation of the vehicle rather than a pair of goggles worn by the observer. This embodiment may be particularly useful for remotely controlled weapon systems, for example a robot carrying a weapon. The current state of the art uses two screens, one for navigation and one for aiming the weapon. A robot operator uses one screen to drive the robot and acquire targets, then refers to an adjacent screen to aim and fire the weapon. Registering the weapon video image to the navigation screen in a manner similar to an infantryman garners similar advantages for the robot operator. Additionally, because a robot's weapon is typically turret-mounted, sensors may be replaced with similar gear or other positional readouts based on turret position, laser rangefinder position, or weapon elevation position.

Figure 6:
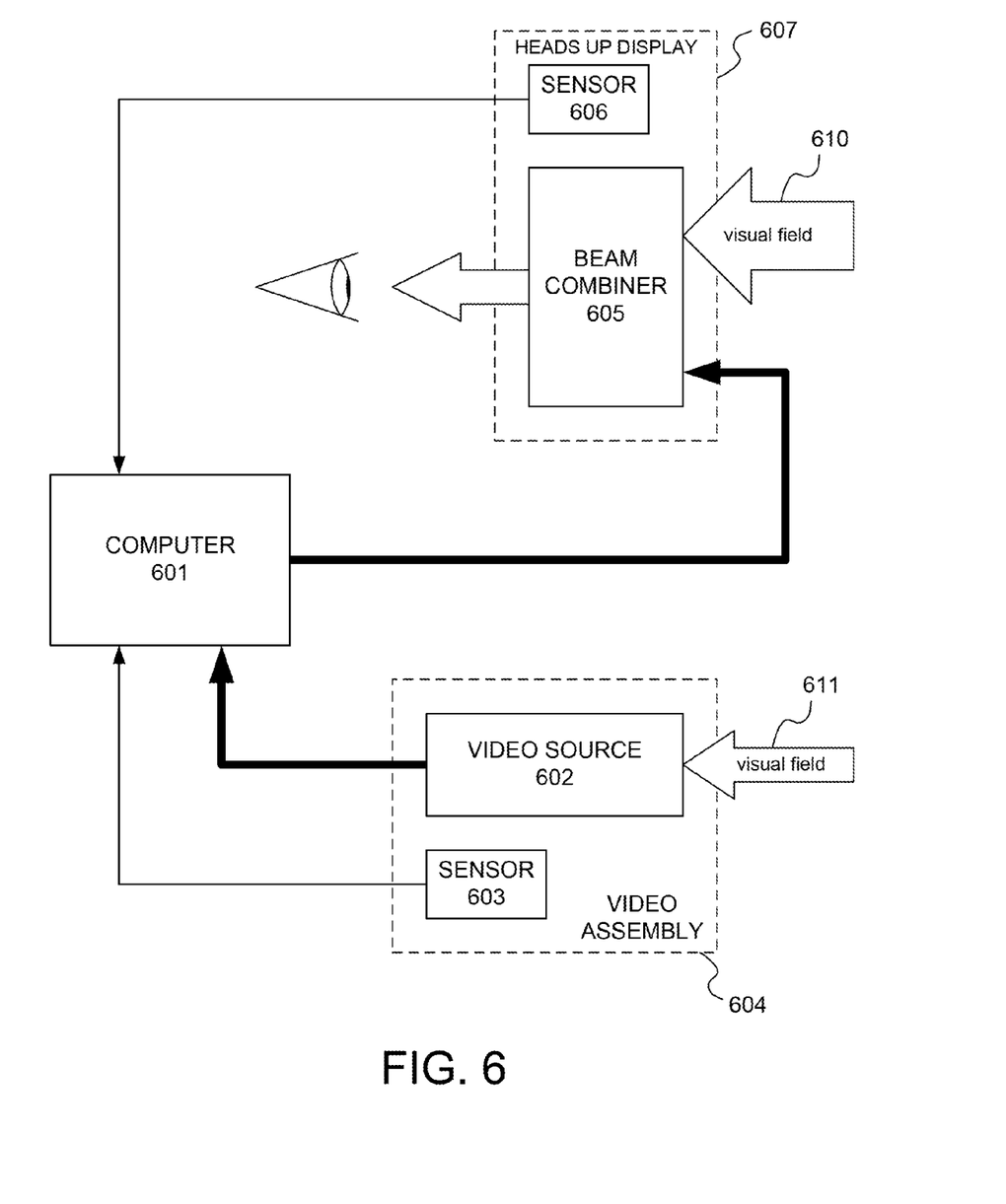
FIG. 6 is a block diagram which depicts the functional components of an illustrative embodiment of the invention.

FIG. 6 is a block diagram which depicts the functional components of an illustrative embodiment of the invention. Here, computer 601 receives sensor data and a video feed from video assembly 604, along with sensor data from heads up display assembly 607. Video assembly 604 is composed of video source 602 and sensor 603 affixed to detect the orientation of the video source. Video source 602 has a visual field 611 from which it receives light and converts it to the video signal delivered to computer 601. Heads up display assembly 607 is composed of beam combiner 605 and sensor 606 affixed to detect the orientation of the beam combiner. Beam combiner 605 has a visual field 610, whose image is combined with the processed video signal delivered from computer 601. This combination of video signal with visual field may be created through the use of a transparent display, such as a piece of glass set at an angle. The glass may pass light from the visual field 610 to the observer while simultaneously reflecting light from a video display strategically placed based on the angle of the glass. The transparent display need not be perfectly transparent, but also might be translucent allowing only some light to pass through. The video output of computer 601 is placed in front of the visual field 610, creating what is sometimes referred to as a heads up display or HUD. Such displays allow an observer to receive information or images while simultaneously viewing a visual field, preventing the observer from having to look away.

Figure 7:
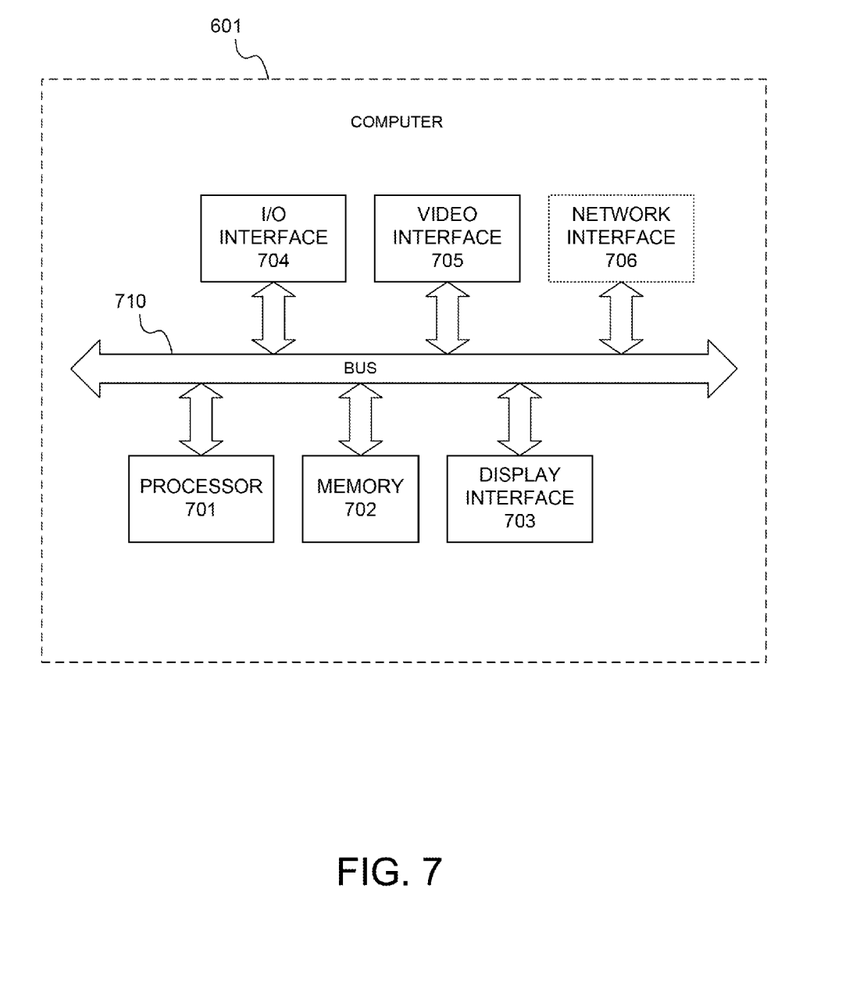
FIG. 7 is a block diagram which depicts the functional components of a computer employed by an illustrative embodiment of the invention.

FIG. 7 is a block diagram depicting the functional components of a computer employed by an illustrative embodiment of the invention. The functional components of computer 601 illustrated here are merely representative of functions. Individual functions may be combined or divided among multiple components within the device. Here, processor 701 is connected to memory 702 via bus 710. Memory 702 may include volatile memory, such as random access memory (RAM), or non-volatile memory, such as Flash or a hard disk drive. Also connected to processor 701 is Input/Output Interface 704, which may communicate with and pass data from connected peripherals, including orientation sensors, perhaps using USB or a wireless standard, such as UWB or Bluetooth. Video interface 705 receives video signals and relays them for storage in memory 702 or processing in processor 701. Display interface 703 relays video signals to an external display, such as the HUD. Optional network interface 706 may be used to communicate with an external computer, possibly to transmit and receive position and situational data (to other team members, or via satellite back to headquarters). Bus 710 may be comprised of a single or multiple signal buses for communicating between components.

Figure 8:
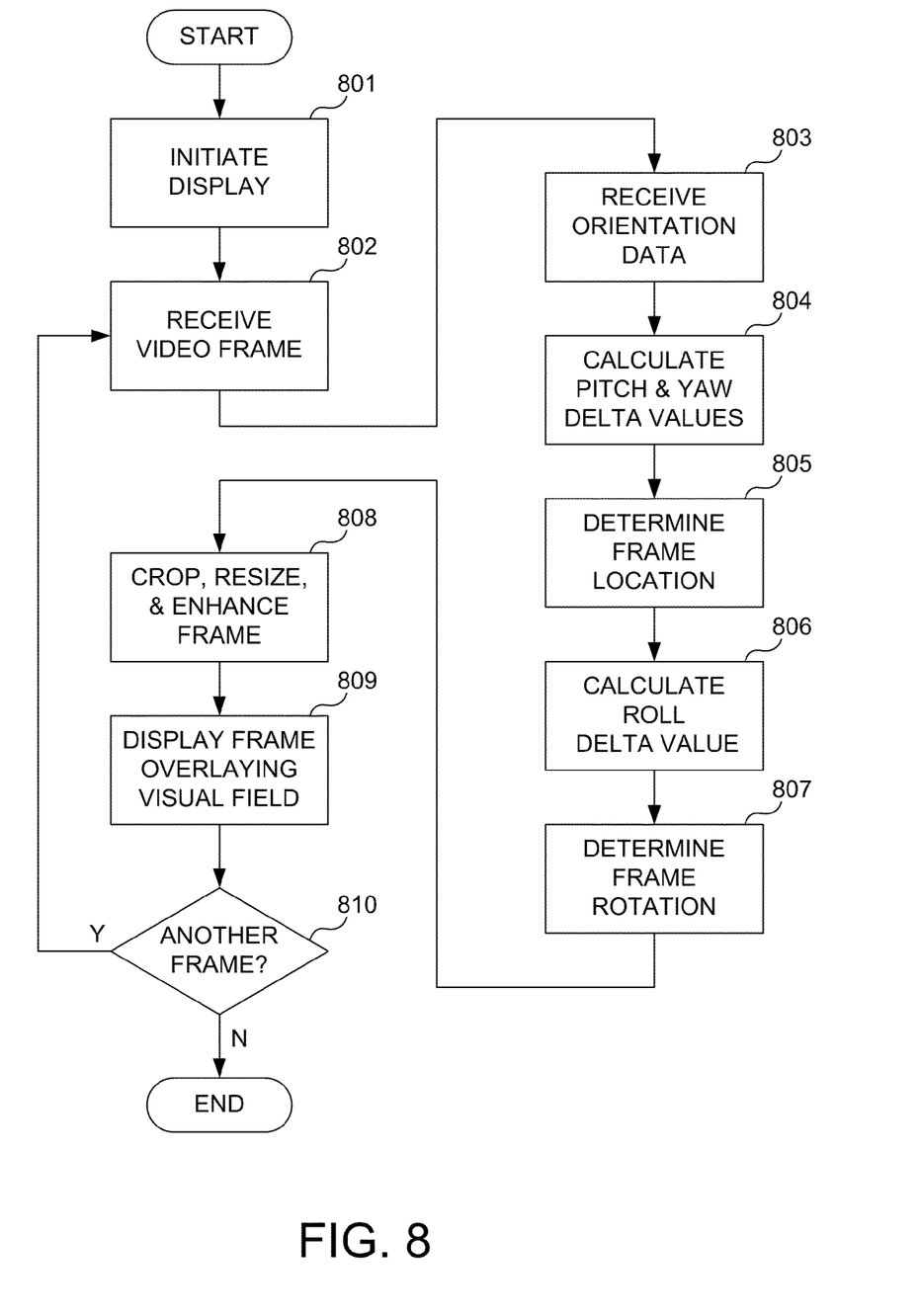
FIG. 8 illustrates a method for registering a video image with an underlying visual field.

FIG. 8 demonstrates an illustrative embodiment of a method for registering a video image with an underlying visual field. It should be noted that the steps pictured here may be reordered, combined, or split to achieve a similar result. Step 801 initiates the method when the heads up display is initiated, either through a switch attached to a video source or gun sight, a switch on a computer, or perhaps on the heads up display itself. Alternatively, the display may be initiated when a weapon is removed from its safety setting. Once initiated, at step 802, a video frame is received for processing. The frame may be processed digitally, and if it is received in analog form may first need to be converted to a digital format for processing.

Along with the receipt of a video frame, orientation data may be received from sensors attached to a heads up display and a video source, as in step 803. This data may be received in the form of pitch, yaw, and roll angular values or in quarternions. Such values indicate the angle of vertical rise (pitch), the angle of horizontal rotation (yaw), and the angle of rotation around the line of sight (roll), for both the display and the video source. Having this data, in step 804, the difference in pitch and yaw values between the display and the video source can be calculated. The pitch delta is the difference in pitch values from the two sensors, and the yaw delta is the difference in yaw values. By knowing the pitch delta and yaw delta, the location of the processed frame within a heads up display is determined, as in step 805. In determining the location, the pitch delta and yaw delta values are mapped from degrees to pixels. This calculation requires determining the number of pixels in a degree of vision, and then multiplying that number by the pitch delta and yaw delta values to determine vertical and horizontal offset from the center of the visual field in pixels.

In step 806, the roll delta value is determined in similar fashion, by finding the difference between the roll values sensed at the video source and display. Based on the roll delta, the processed frame can be rotated for presentation within the heads up display, as in step 807. Various algorithms for rotating an image by a certain number of degrees are well known in the art.

Once the location and rotation of the processed frame within the display are determined, the frame may be cropped, discarding unneeded pixels, as in step 808. The frame may be resized in order to map the video information onto the pixels that will ultimately be used in a heads up display. This step may be necessary if the video images produced by a video source are larger than needed for display. For example, if a video image initially has a field of view of 8 degrees horizontal and 6 degrees vertical, it may be cropped down to 4 degrees horizontal and 3 degrees vertical, retaining the same center point. In this fashion, only a quarter of the image is retained, but it constitutes the most relevant part of the image. Alternatively, the video frame may need to be magnified or compressed in order to adjust for differences in magnification between the visual field and the native video frame. In addition, the frame may be enhanced by adding a border around the frame so as to further distinguish it from the visual field for an observer.

The processed video frame, at this point, may be displayed in a heads up display, as in step 809. The colored pixels of the processed frame are surrounded by dark or black pixels, which equate to transparent in a heads up display. The displayed frame appears before a visual field from the perspective of an observer of the visual field. The calculated position and rotational orientation of the processed frame place it on the display approximately in front of the same subject matter depicted in the visual field. In addition to the frame itself, additional information may be added to the display, for example, battery life data. The final display image, including the processed and repositioned video frame and any other information, is sent to the display, possibly using a standard video format such as 12-bit Video or NTSC.

At this point in the process, at decision 810, if another frame of video is set to be received (i.e., the display is still on), then the process repeats for each new frame, returning to step 802. In this fashion, each frame of video is individually processed, modifying the frame, positioning and rotating it based on the difference in orientations between the video source and the display, and then displaying it. As such, if the video source moves from left to right, then its orientation data will change, and subsequent displayed frames will move left to right across the visual field, aligning or registering each frame with the portion of the visual field it overlays. Once there are no longer any frames to be processed (i.e., the display has been turned off), the process comes to an end.

Figure 9A:
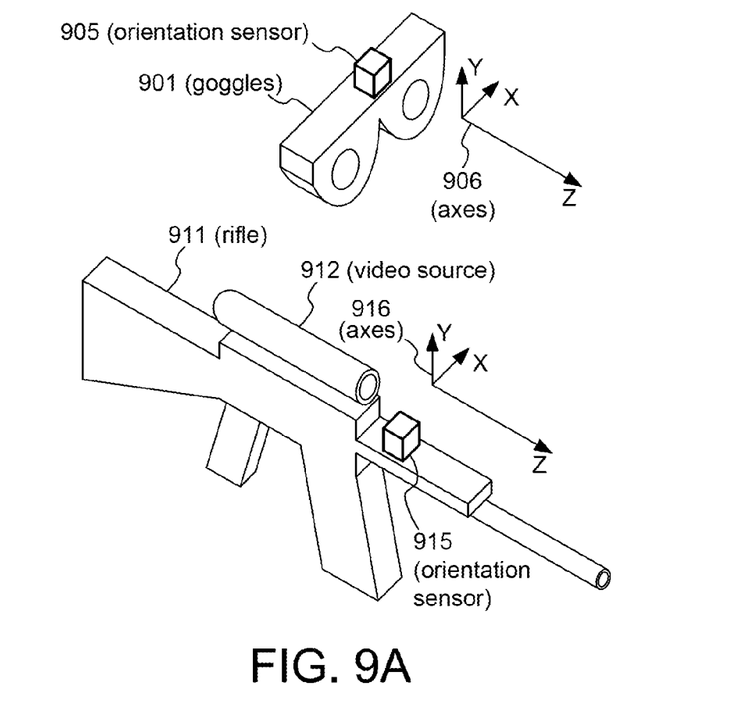
FIG. 9A depicts an illustrative embodiment of the invention with a video source and heads up display visually aligned.

FIG. 9A depicts an illustrative embodiment of the invention in the form of a video source 912 affixed to rifle 911 and heads up display goggles 901. The direction that rifle 911 and video source 912 are pointing is sensed by orientation sensor 915. The line of sight for the video source is indicated by the Z-axis on axes 916. The direction that heads up display goggles 901 are pointing is sensed by orientation sensor 905. The line of sight for the goggles 901 is indicated by the Z-axis on axes 906. Here, axes 906 and 916 are in alignment. The goggles are looking in exactly the same direction as the weapon is pointed. As such, the orientation sensors 905 and 915 will output the same values for pitch, yaw and roll.

Figure 9B:
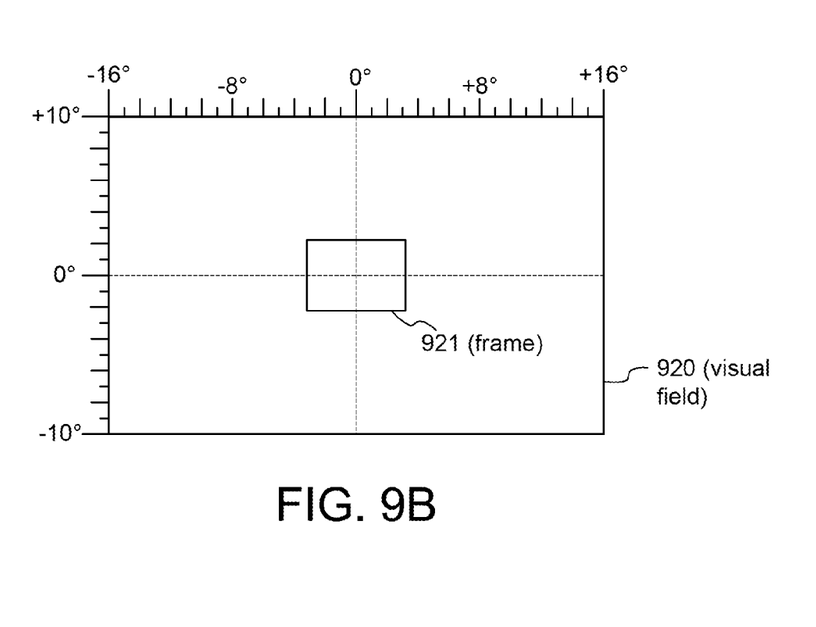
FIG. 9B illustrates a combined image created by the illustrative embodiment of FIG. 9A.

The effect of this upon the heads up display is depicted in FIG. 9B, which illustrates a combined image created by the illustrative embodiment of FIG. 9A. When a frame 921 from the video source 912 is processed using an embodiment of the invention, it is placed in the center of the visual field 920, as shown. Here, the visual field is depicted with increments of degrees which represent the field of view, in this case through the heads up display goggles 901. The example visual field 920 for the goggles 901 has a field of view that is 32 degrees horizontally (yaw) and 20 degrees vertically (pitch). If the pitch delta and yaw delta values are zero (i.e., the goggles and video source are aligned), then the frame 921 is displayed in the center of the visual field 920, as shown here. The roll delta value is also zero here, because the rifle 911 and goggles 901 are both rotationally aligned with each other around their respective Z-axes. As such, the frame 921 is displayed without rotation.

Figure 10A:
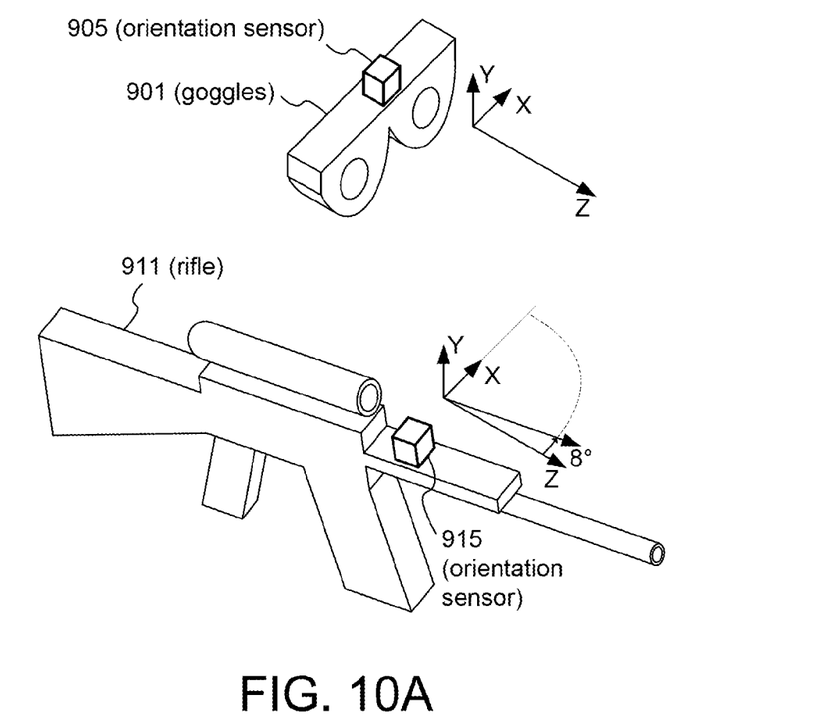
FIG. 10A depicts an illustrative embodiment of the invention with a video source and heads up display visually offset horizontally.
Figure 10B:
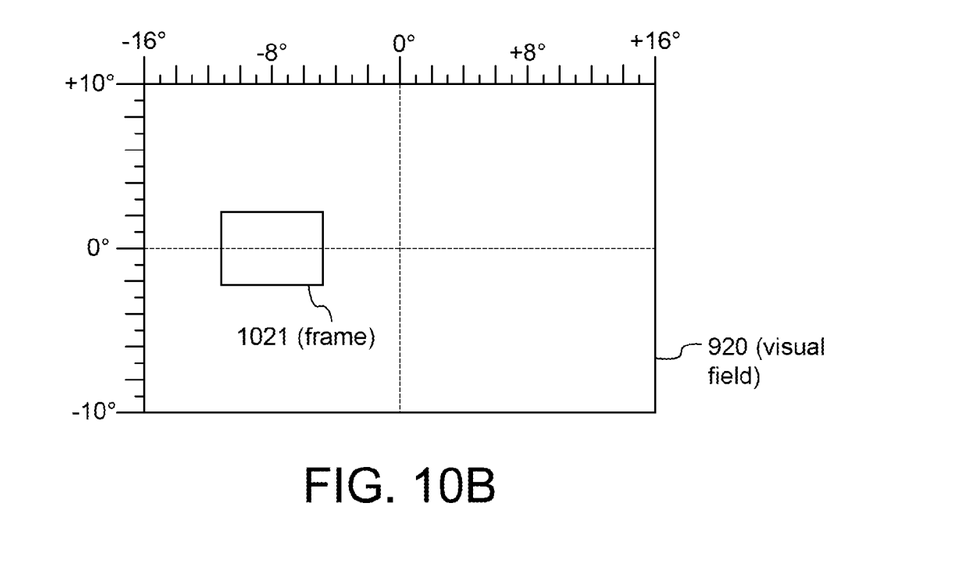
FIG. 10B illustrates a combined image created by the illustrative embodiment of FIG. 10A.

FIG. 10A depicts the same components as FIG. 9A. Here, however, the rifle 911 has been rotated horizontally by 8 degrees to the left. FIG. 10B depicts the subsequent change in the visual field 920. The pitch and roll values detected by orientation sensor 915 remain unchanged. However, the yaw value detected will change by 8 degrees to the left. When this is compared to the values detected by the orientation sensor 905 affixed to goggles 901, which haven't changed, the yaw delta value will be −8 degrees. When processed, this yaw delta value will change the placement of the frame 1021 in the heads up display, shifting it to the left as shown. If the yaw value exceeds the visual field width, the frame may still appear within the visual field, but with a distinctive border, indicating to the user that the rifle is pointing outside the visual field. The frame remains visible, however, giving the user a view of where the weapon is pointing. The frame position will be in the direction of the actual weapon pointing direction, allowing the user to rapidly and instinctively adjust his visual field or his weapon to bring the two back together.

Figure 11A:
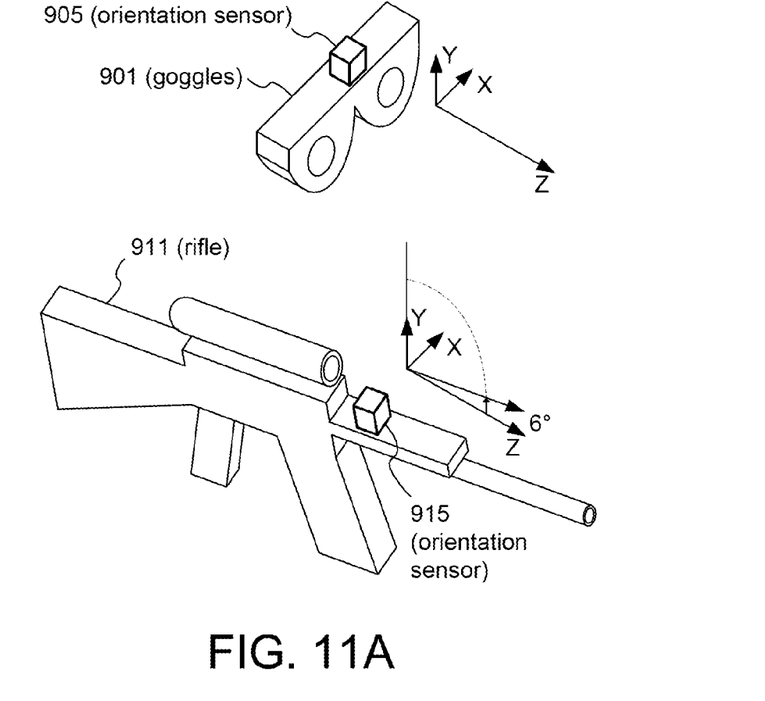
FIG. 11A depicts an illustrative embodiment of the invention with a video source and heads up display visually offset vertically.
Figure 11B:
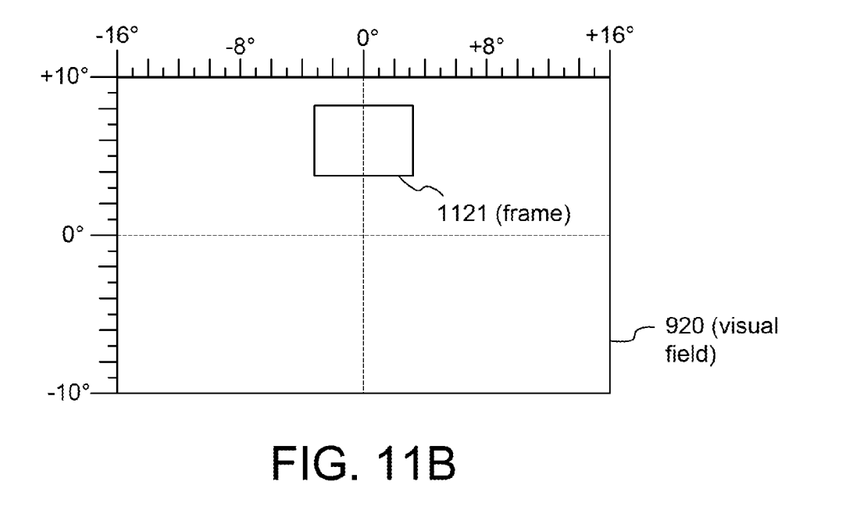
FIG. 11B illustrates a combined image created by the illustrative embodiment of FIG. 11A.

FIG. 11A again depicts the same components as FIG. 9A. Here, the rifle 911 has been rotated vertically (rather than horizontally) up 6 degrees. FIG. 11B depicts the subsequent change in the visual field 920. The yaw and roll values detected by orientation sensor 915 remain unchanged, but the pitch value detected will change, up 6 degrees. When compared to the unchanged values from the orientation sensor 905 affixed to the goggles 901, the pitch value will be +6 degrees. When frame 1121 is processed, this pitch delta value will change the placement of the frame in the heads up display, shifting it up as shown.

Figure 12A:
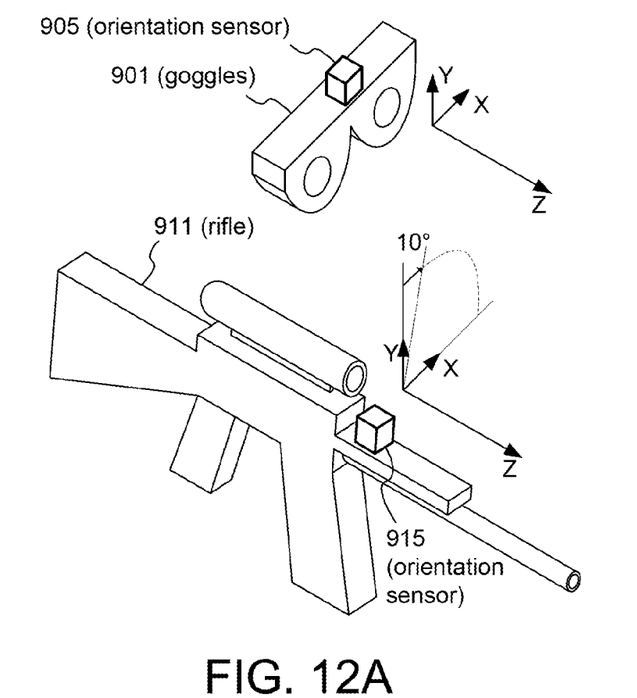
FIG. 12A depicts an illustrative embodiment of the invention with a video source and heads up display visually offset in rotation.
Figure 12B:
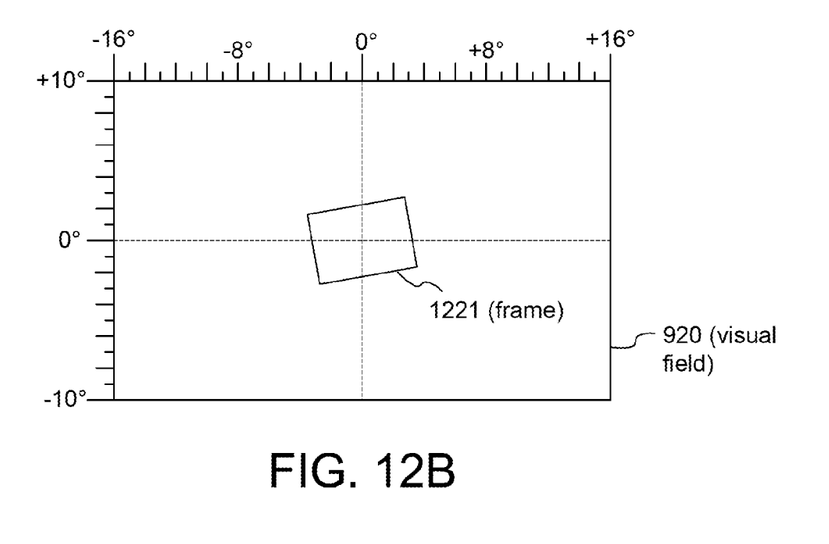
FIG. 12B illustrates a combined image created by the illustrative embodiment of FIG. 12A.

FIG. 12A is a final depiction of the same components as FIG. 9A. Here, the rifle 911 has been rolled around its line of sight by 10 degrees, counterclockwise. FIG. 12B depicts the subsequent change in the visual field 920. The pitch and yaw values detected by the rifle's orientation sensor 915 remain unchanged, but the roll value detected is different, counterclockwise 10 degrees. When compared to the unchanged values from the orientation sensor 905 affixed to the goggles 901, the roll delta value will be 10 degrees. When frame 1221 is processed, this roll delta value will change the rotation of the frame in the heads up display, rotating it counterclockwise. It should be noted that although FIGS. 10A-12B depict only motion around a single axis at a time, the technique may be applied to motion in all directions.

One possible consideration for the above described methods and systems is the problem of parallax. That is, because a video source and a heads up display are separated by some distance (e.g. 0.5 meters), if both devices are perfectly aligned, they will in fact be looking at slightly different points. As a result, in processing a video frame, the location where the frame is placed may be slightly off, and a displayed frame of video will not be aligned as perfectly as possible. However, this problem diminishes as the distance to a target increases. The further away the target, the smaller the change in degrees, and hence the smaller the error produced. For example, a target at 10 meters with 0.5 meters between gun sight and goggles produces an error of about 2.9 degrees in the placement of the video frame. At 100 meters, with the same 0.5 meters between gun sight and goggles, the error is only 0.29 degrees in the placement of the video frame.

The problem of parallax is to some extent a non-issue. The system proposed would likely be used for targets at distances greater than 10 meters more often than not. Moreover, when targeting a weapon using the system, the video frame displayed in the heads up display will ultimately be the source of assurance that a soldier's weapon is pointed at a proper target. Even if a video gun sight image is slightly misaligned with the visual field surrounding it, the soldier will primarily care that his weapon is pointed at the correct target. Further, the absolute amount of misalignment will be only 0.5 meters at worst using the above example. The video gun sight image will still appear over or next to the intended target. Note that weapon accuracy is governed by zeroing the weapon and the video gun sight image, so parallax has no effect on bullet accuracy.

To the extent that parallax is an issue, it can be handled in several ways. One solution is to integrate a range finder, such as a laser range finder, into the system to automatically detect the distance of targets and, given a known weapon-goggle distance, adjust the image placement accordingly. Another solution is to provide a range adjustment control which a soldier can use to manually adjust the range to a target, and accordingly adjust image placement.

Parallax may also be an issue when calibrating the orientation sensors. Calibration may be required when initially configuring the invention, and may also be required if a severe jolt to the system causes misalignment of the sensors. One solution may be to provide a button which is pushed to signal calibration. While holding the button, a reticle may appear in the center of the visual field while the video image may appear motionless off to the side. Once the visual field and video image are both centered on the same target, releasing the calibration button signals alignment to the system. The portion of the invention which calculates the position of the video image may then adjust its calculations accordingly. Centering on a distant target (for example, greater than 300 meters) during the calibration routine may be required as parallax will induce an angular error in closer targets, as described above.

Alternative embodiments may provide additional solutions to the issue of parallax. In one such embodiment, the image produced in the visual field of a display is captured by a second video camera. This second video feed or goggle image, along with the video images from the video source, are both fed into a computer for initial digital processing. As such, well known rigid or non-rigid image registration techniques may be used to register the images by, for example, finding common visual elements between them. This process is accelerated by having, based on the orientation data, a starting point from which to search the goggle image. Once the precise location of the video image is registered within the goggle image, the video image can be more accurately aligned. The video image may then be displayed in the heads up display alone, or the heads up display may be filled with the resultant combination of video image and goggle image.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A system comprising:
    a video camera adapted to provide, in a video feed, data for a series of video images representing portions of a visual field;
    a first orientation sensor adapted to detect an orientation of the video camera;
    a heads up display (HUD) adapted for viewing of the visual field by a user of the system wherein the HUD comprises a transparent display, and wherein the HUD and the video camera are independently movable about multiple axes;
    a second orientation sensor adapted to detect an orientation of the HUD; and
    a computer adapted to receive sensor data from the first and second orientation sensors, to receive the video feed from the video camera, and to display the video images, on the transparant display and based on the received sensor data, in positions that overlay portions of the visual field represented by the displayed video images wherein boundaries of the displayed video images are in registration with boundaries of portions of the visual field represented by the displayed video images, and wherein the computer is adapted to
    determine a source orientation of the video camera, and
    determine a display orientation of the transparent display.

2. The system of claim 1, wherein the HUD is housed in a pair of goggles.

3. The system of claim 1, wherein the video camera is attached to a weapon and the video feed is of a line of sight of the weapon.

4. The system of claim 1, wherein
    the video camera is a weapon sight attached to a weapon,
    the first orientation sensor is affixed to the weapon and,
    the computer is adapted to resize and crop the video images.

5. The system of claim 1, wherein the HUD is housed in a pair of night-vision goggles.

6. The system of claim 5, wherein the video camera is attached to a weapon.

7. The system of claim 6, wherein the video camera is a thermal gun sight.

8. The system of claim 1, wherein the video camera is a thermal gun sight.

9. The system of claim 1, wherein the computer is adapted to reposition the displayed video images within the transparent display when the video camera or transparent display moves.

10. The system of claim 9, wherein the video camera is attached to a weapon.

11. The system of claim 10, wherein the video feed is of a line of sight of the weapon.

12. The system of claim 1, wherein the computer is a field computer adapted to be worn and carried by a human user.

* * * * *